UNITED STATES PATENT OFFICE.

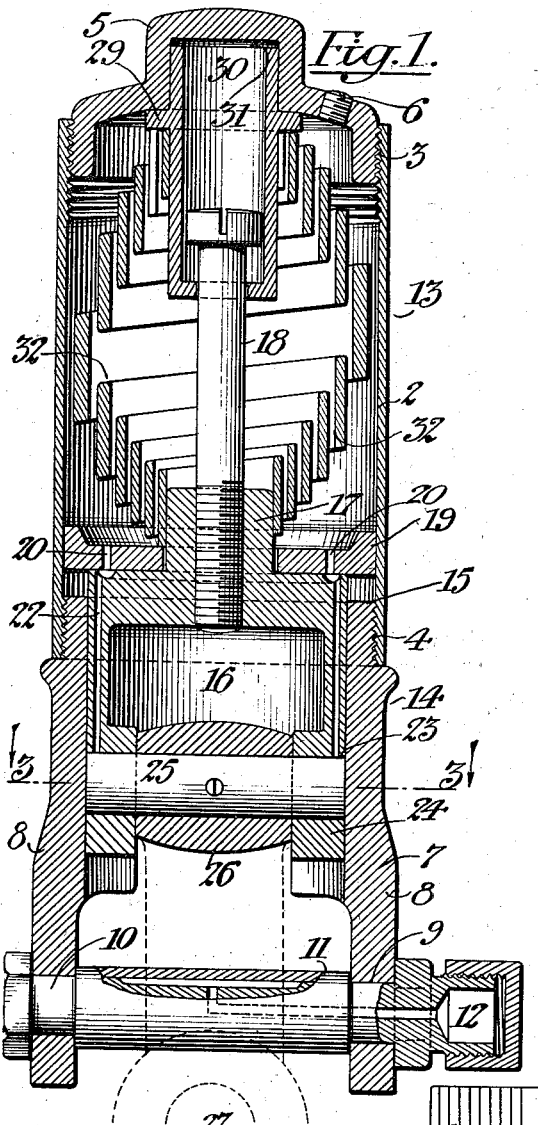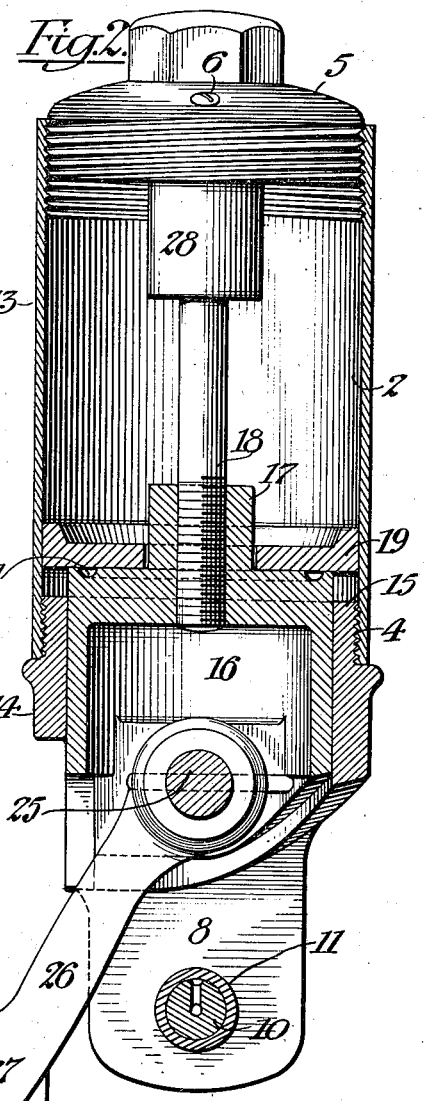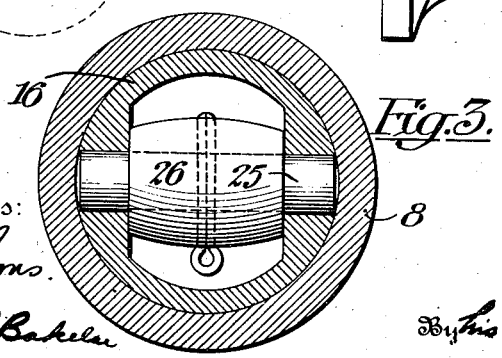

JOHN GRAW ROCK, OF MOUNT VERNON, NEW YORK, ASSIGNOR TO VOLUTE SPRING SHOCK ABSORBER COMPANY, OF MOUNT VERNON, NEW YORK.

SHOCK-ABSORBER.

1,143,070.

Specification of Letters Patent.

Patented June 15, 1915.

Application filed September 29, 1914. Serial No. 864,147.

*To all whom it may concern:*

Be it known that I, JOHN GRAW ROCK, subject of the King of Norway, residing at Mount Vernon, in the county of Westchester and State of New York, have invented certain new and useful Improvements in Shock-Absorbers, of which the following is a specification.

This invention relates to shock absorbers for motor vehicles, more particularly to that form of shock absorber especially designed for light weight cars such as the Ford, in which style of car it is necessary that the shock absorber stand upright instead of hang, the object of the invention being to provide an improved form of shock absorber comparatively simple in construction and operation and inexpensive to construct, and which, while essentially a spring-controlled shock absorber, has the action of the spring thereof materially assisted by a pneumatic action, and in which improved shock absorber all the vertical stresses, whether up or down, will operate to compress the spring of the shock absorber thus avoiding the usual and less desirable alternating compression and tension effects.

In the drawings accompanying and forming part of this specification, Figure 1 is a vertical sectional view of this improved shock absorber; Fig. 2 is a similar view taken at right angles to Fig. 1, with the spring omitted; and Fig. 3 is a cross-sectional view taken in line 3—3 of Fig. 1.

Similar characters of reference indicate corresponding parts throughout the several figures of the drawings.

This improved shock absorber comprises, in the preferred form thereof, a pair of members one of which may be designated as a casing member, and the other as a piston member, and both of which have means for attachment to separate parts of a vehicle.

In the present improvement the casing member comprises a cylindrical casing 2 interiorly threaded at both ends as at 3 and 4, the upper end of which is fitted with a cap or closure 5 readily detachable and provided with a closed threaded opening 6 for the insertion of oil or grease as occasion may require. Secured, in the present instance by threads, to the lower end of this cylindrical casing is an annular chamber formed member 7 having projecting therefrom a pair of spaced ears or arms 8 provided with bolt openings 9 for the reception of a bolt 10 and bushing 11. On the end of this bolt is a grease cup 12. By means of this bolt this member of the shock absorber is attached to the spring of a vehicle. This casing member is of different diameters, as at 13 and 14, and has an annular shoulder 15. Located within this casing member is the piston member comprising a cylindrical bifurcated piston head or block 16 closely fitting the part 14 and provided with an interiorly threaded hub 17 for the reception of a vertical piston rod or bolt 18. On this hub 17 is loosely mounted a recessed disk 19 having oil passages 20 therethrough communicating with an annular groove 21 in the top of the cylindrical block, which annular groove communicates by one or more oil passages 22, shown as two in number, with bolt openings 23 in the lower spaced ends or arms 24 of the cylindrical block 16. A bolt 25 is secured in these openings and to this bolt 25 a projecting arm 26 is cotter-pinned. This laterally projecting arm 26 has a stud 27 for insertion into the hub of the vehicle axle. The headed end of the bolt 18 hereinbefore referred to projects into a tubular member 28 having a collar or flange 29 and the upper end 30 of which member fits into a circular opening 31 in the upper closure cap 5 so that the collar will engage the cap. Between this flange or collar 29 and the disk 19 is located the spring 32 shown as a double pyramidal volute spring of flat ribbon form. In practice, of course, the spring is normally under compression and this compression is increased by the relatively vertical movements of the parts.

In operation it will be observed that the space formed between the disk 19 and the annular shoulder 15 provides for an air cushion between these parts. That is to say, as the spring maintains the disk 19 in engagement with the end of the piston when the parts are in the normal position shown in Fig. 1 there is an air chamber formed between the disk 19 and the shoulder 15, so that during the relative movement of the piston and its chamber this air space is either increased or decreased, so that when it is decreased the compression of the air will assist in absorbing the shock.

It will be understood that the various details may be more or less changed without departing from the spirit or scope of the improvement.

I claim as my invention:—

1. A shock absorber comprising a cylindrical casing having a piston chamber and a pair of spaced arms for attachment to one part of a vehicle, a piston fitting and sliding within said chamber and also having spaced arms for attachment to another part of a vehicle and also provided with a piston rod, and a spring located on said rod between said piston and the end of said casing.

2. An upright shock absorber comprising a cylindrical casing having a piston chamber and at its lower end a pair of spaced arms for attachment to one part of a vehicle, a piston fitting and sliding within said chamber and also having at its lower end spaced arms for attachment to another part of a vehicle and also provided with a piston rod, and a spring located on said rod between said piston and the upper end of said casing.

3. An upright shock absorber comprising a cylindrical casing having a piston chamber and at its lower end a pair of spaced arms for attachment to one part of a vehicle, a piston fitting and sliding within said chamber and also having at its lower end spaced arms for attachment to another part of a vehicle and also provided with a piston rod, and a double pyramidal volute spring located on said rod between said piston and the upper end of said casing, whereby the vertical stress in either direction will compress the spring.

4. A shock absorber comprising a cylindrical casing having a piston chamber and a pair of spaced arms for attachment to one part of a vehicle, a piston fitting and sliding within said chamber and also having spaced arms for attachment to another part of a vehicle and also provided with a piston rod, and a double pyramidal volute spring located on said rod between said block and the end of said casing, whereby the vertical stress in either direction will compress the spring.

5. A shock absorber comprising a cylindrical casing having a piston chamber and a pair of spaced arms for attachment to one part of a vehicle, a piston fitting and sliding within said chamber and also having spaced arms for attachment to another part of a vehicle and also provided with a piston rod, a loosely mounted disk carried by said piston, and a double pyramidal volute spring located on said rod between said disk and the end of said casing.

6. A shock absorber comprising a cylindrical casing having a pair of spaced arms for attachment to one part of a vehicle and having an annular shoulder, a cylindrical block sliding within said casing and having a hub and also having spaced arms for attachment to another part of a vehicle, a loosely mounted disk carried by said hub and forming an air chamber between it and said shoulder, and a spring located between said disk and the end of said casing.

7. A shock absorber comprising a cylindrical casing having a pair of spaced arms for attachment to one part of a vehicle and having an annular shoulder, a cylindrical block sliding within said casing and having a hub and also having spaced arms for attachment to another part of a vehicle, a loosely mounted disk carried by said hub and forming an air chamber between it and said shoulder, a bolt projecting into said hub, means for guiding the bolt at its opposite end and comprising a flanged member, and a spring located between said disk and the flange of said member.

8. A shock absorber comprising a cylindrical casing having a piston chamber and also having means for attachment to one part of a vehicle, a piston head fitting and sliding within said chamber and also having means for attachment to another part of the vehicle and also provided with a piston rod extending in the opposite direction to said attaching means, and a spring carried by said rod between said piston head and the end of said casing.

9. An upright shock absorber comprising a cylindrical casing having at its lower end a pair of spaced arms for attachment to one part of a vehicle and also having an annular shoulder, a cylindrical block sliding within said casing and also having spaced arms at its lower end, a laterally extending studded member secured between said last spaced arm for attachment to another part of a vehicle, a loosely mounted disk forming between it and said annular shoulder an air chamber, a bolt projecting into said block, means for guiding the upper end of said bolt, and a double pyramidal volute spring located between said disk and the upper end of the casing.

10. A shock absorber comprising a cylindrical casing of different diameters forming an annular shoulder and having at one end a pair of spaced arms for attachment to one part of a vehicle and a closed opposite end, a cylindrical block slidingly fitting that part of the cylinder having the smaller diameter and having means for attachment to another part of a vehicle, a bolt secured to said block, a disk fitting that part of the casing having the larger diameter thereby to form an air cushion between it and the annular shoulder, means carried by the bolt for engaging the closed upper end of the casing, and a spring between said last means and said disk.

11. A shock absorber comprising a cylindrical casing of different diameters forming an annular shoulder and having at one end a pair of spaced arms for attachment to one part of a vehicle and a closed opposite end, a piston head slidingly fitting that part of the cylinder having the smaller diameter and having means for attachment to another part of a vehicle and also provided with a rod extending in the opposite direction to said attaching means, a bolt secured to said block, a disk fitting that part of the casing having the larger diameter thereby to form an air cushion between it and the annular shoulder, means carried by the rod for engaging the closed end of the casing, and a double pyramidal volute spring carried by said rod between said last means and said annular disk.

12. An upright shock absorber comprising a cylindrical casing of different diameters forming an annular shoulder and having at its lower end a pair of spaced arms for attachment to one part of a vehicle and a closed upper end, a cylindrical block slidingly fitting that part of the cylinder having the smaller diameter and having laterally projecting means at its lower end having a stud for attachment to another part of a vehicle, an upright bolt secured to said block, a disk fitting that part of the casing having the larger diameter thereby to form an air cushion between it and the annular shoulder, means carried by the bolt for engaging the closed upper end of the casing, and a double pyramidal volute spring between said last means and said annular disk.

13. An upright shock absorber comprising a cylindrical casing of different diameters forming an annular shoulder and having at its lower end a pair of spaced arms for attachment to one part of a vehicle and a closed upper end, a cylindrical block slidingly fitting that part of the cylinder having the smaller diameter and having laterally projecting means at its lower end having a stud for attachment to another part of a vehicle, an upright bolt secured to said block, a disk fitting that part of the casing having the larger diameter thereby to form an air cushion between it and the annular shoulder, tubular flanged means carried by the bolt for engaging the closed upper end of the casing, and a double pyramidal volute spring between said last means and said annular disk.

14. An upright shock absorber comprising a cylindrical casing having a detachable closure at its upper end, a detachable chamber forming member at its lower end, such chamber forming member and casing forming an annular shoulder and said chamber forming member having a pair of spaced arms for attachment to one part of a vehicle, a cylindrical block located within said chamber forming member and having spaced arms at its lower end, a laterally projecting member secured between said last spaced arms for attachment to another part of a vehicle, and said block also having a hub, a loosely mounted disk carried by said hub and forming between said disk and said shoulder an air chamber, a bolt carried by said hub, a tubular flanged member for guiding the opposite end of said bolt and projecting into the opening in the upper detachable closure, and a double pyramidal volute spring located between the flange of said tubular member and said disk.

15. An upright shock absorber comprising a cylindrical casing having a detachable closure at its upper end, a detachable chamber forming member at its lower end, such chamber forming member and casing forming an annular shoulder and said chamber forming member having a pair of spaced arms for attachment to one part of a vehicle, a cylindrical block located within said chamber forming member and having spaced arms at its lower end, a laterally projecting member secured between said last spaced arms for attachment to another part of a vehicle, and said block also having a hub, a loosely mounted disk carried by said hub and forming between said disk and said shoulder an air chamber, a bolt carried by said hub, a tubular flanged member for guiding the opposite end of said bolt and projecting into the opening in the upper detachable closure, and a double pyramidal volute spring located between the flange of said tubular member and said disk.

16. A shock absorber comprising a member having a piston chamber and also having means for attachment to one part of a vehicle, a piston head fitting and sliding within said chamber and also having means for attachment to another part of the vehicle and also provided with a piston rod extending in the opposite direction to said attaching means, and a double acting pyramidal volute spring carried by said rod between said piston head and a fixed part of said member whereby the vertical stresses in either direction will compress said spring.

JOHN GRAW ROCK.

Witnesses:
F. E. BOYCE,
W. L. BAKELAR.